United States Patent
Tyra et al.

(10) Patent No.: US 9,530,156 B2
(45) Date of Patent: Dec. 27, 2016

(54) CUSTOMIZABLE UNIFORM CONTROL USER INTERFACE FOR HOSTED SERVICE IMAGES

(75) Inventors: Andrew S. Tyra, Seattle, WA (US); John Daniel Thimsen, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 270 days.

(21) Appl. No.: 13/249,054

(22) Filed: Sep. 29, 2011

(65) Prior Publication Data

US 2013/0085899 A1    Apr. 4, 2013

(51) Int. Cl.
*G06Q 30/00* (2012.01)
*G06Q 30/06* (2012.01)
*G06F 15/177* (2006.01)
*G06Q 30/02* (2012.01)
*G06F 9/44* (2006.01)

(52) U.S. Cl.
CPC ............. *G06Q 30/06* (2013.01); *G06F 9/4443* (2013.01); *G06F 15/177* (2013.01); *G06Q 30/02* (2013.01)

(58) Field of Classification Search
CPC .... G06Q 30/08; G06Q 30/06; G06Q 30/0601; G06Q 30/02; G06F 15/177; G06F 9/4443
USPC ................................................ 705/26.1, 27.1
See application file for complete search history.

(56) References Cited

U.S. PATENT DOCUMENTS

| | | | |
|---|---|---|---|
| 4,788,637 A | 11/1988 | Tamaru | |
| 5,757,908 A | 5/1998 | Cooper et al. | |
| 5,870,717 A | 2/1999 | Wiecha | |
| 6,664,981 B2 * | 12/2003 | Ashe et al. | 715/765 |
| 6,735,768 B1 | 5/2004 | Tanaka | |

(Continued)

FOREIGN PATENT DOCUMENTS

| | | |
|---|---|---|
| CA | 2554462 | 8/2005 |
| CN | 103959317 A | 7/2014 |

(Continued)

OTHER PUBLICATIONS

"Sforce 2.0-Industry's First On-Demand Application Server—Deployed Immediately to 120,000 Subscribers and 8400 Customers with Salesforce.com Winter '04 Release", Business Wire: 5278. Business Wire (Dec. 8, 2003).*

(Continued)

*Primary Examiner* — Anne Georgalas
(74) *Attorney, Agent, or Firm* — Knobbe, Martens, Olson & Bear, LLP

(57) ABSTRACT

An electronic marketplace for service images permits users to browse descriptions of service images implementing desired functionalities of a virtual machine image. The described service images may contain one or more software applications and may be further offered for purchase through an electronic service image marketplace. The electronic marketplace can further provide uniform control objects that are associated with multiple service images and multiple instruction sets. Following an interaction with a particular uniform control object, the electronic marketplace can perform an action on a particular service image based on an association between the particular uniform control object and a particular instruction set associated with the particular service image.

21 Claims, 5 Drawing Sheets

(56) References Cited

U.S. PATENT DOCUMENTS

| | | | |
|---|---|---|---|
| 6,910,071 B2 | 6/2005 | Quintero et al. | |
| 7,089,259 B1 | 8/2006 | Kouznetsov et al. | |
| 7,165,041 B1 | 1/2007 | Guheen et al. | |
| 7,315,830 B1 | 1/2008 | Wirtz et al. | |
| 7,324,969 B2 | 1/2008 | Pallister et al. | |
| 7,433,835 B2* | 10/2008 | Frederick et al. | 705/26.1 |
| 7,466,835 B2 | 12/2008 | Stenberg et al. | |
| 7,467,206 B2 | 12/2008 | Moore et al. | |
| 7,729,954 B2 | 6/2010 | Frederick et al. | |
| 7,729,955 B2 | 6/2010 | Frederick et al. | |
| 7,778,874 B1 | 8/2010 | Saunders | |
| 7,797,198 B1 | 9/2010 | Frederick et al. | |
| 7,797,271 B1 | 9/2010 | Bonneau et al. | |
| 7,801,771 B1 | 9/2010 | Sirota et al. | |
| 7,908,358 B1 | 3/2011 | Prasad et al. | |
| 7,953,642 B2 | 5/2011 | Dierks | |
| 7,958,529 B2 | 6/2011 | Green et al. | |
| 8,005,723 B1 | 8/2011 | Sirota et al. | |
| 8,019,652 B1 | 9/2011 | Frederick et al. | |
| 8,019,653 B1 | 9/2011 | Frederick et al. | |
| 8,019,660 B2* | 9/2011 | Westphal | G06Q 30/06 705/26.1 |
| 8,024,225 B1 | 9/2011 | Sirota et al. | |
| 8,185,220 B2* | 5/2012 | Lloyd | G05B 19/056 700/18 |
| 8,442,234 B2 | 5/2013 | Brown et al. | |
| 8,543,931 B2* | 9/2013 | Forstall | G06F 3/04817 715/762 |
| 9,288,117 B1* | 3/2016 | Angrish | |
| 2002/0085037 A1* | 7/2002 | Leavitt | G06F 3/04817 715/765 |
| 2002/0120461 A1 | 8/2002 | Kirkconnell-Ewing et al. | |
| 2002/0120519 A1 | 8/2002 | Martin et al. | |
| 2003/0078850 A1 | 4/2003 | Hartman et al. | |
| 2003/0195813 A1 | 10/2003 | Pallister et al. | |
| 2003/0200185 A1 | 10/2003 | Huerta et al. | |
| 2003/0217357 A1 | 11/2003 | Parry | |
| 2004/0010440 A1 | 1/2004 | Lenard et al. | |
| 2004/0122926 A1 | 6/2004 | Moore et al. | |
| 2004/0243583 A1 | 12/2004 | Olsen | |
| 2005/0010916 A1 | 1/2005 | Hagen et al. | |
| 2005/0039034 A1 | 2/2005 | Doyle et al. | |
| 2005/0256882 A1* | 11/2005 | Able et al. | 707/10 |
| 2007/0022447 A1 | 1/2007 | Arseneau et al. | |
| 2007/0067297 A1 | 3/2007 | Kublickis | |
| 2007/0130156 A1 | 6/2007 | Tenhunen et al. | |
| 2007/0233540 A1* | 10/2007 | Sirota | 705/8 |
| 2007/0294399 A1 | 12/2007 | Grossner et al. | |
| 2007/0300240 A1 | 12/2007 | Viegener et al. | |
| 2008/0080396 A1 | 4/2008 | Meijer et al. | |
| 2008/0098462 A1 | 4/2008 | Carter | |
| 2008/0103975 A1 | 5/2008 | Taratino et al. | |
| 2009/0037337 A1 | 2/2009 | Baitalmal et al. | |
| 2009/0037492 A1 | 2/2009 | Baitalmal et al. | |
| 2009/0100331 A1 | 4/2009 | Sauve et al. | |
| 2009/0119779 A1 | 5/2009 | Dean et al. | |
| 2009/0138380 A1 | 5/2009 | Roseman et al. | |
| 2009/0241037 A1 | 9/2009 | Hyndman | |
| 2009/0249329 A1 | 10/2009 | Dash | |
| 2009/0288082 A1 | 11/2009 | Nazeer et al. | |
| 2010/0114739 A1 | 5/2010 | Johnston | |
| 2010/0262508 A1 | 10/2010 | Volnak | |
| 2011/0119191 A1 | 5/2011 | Stern et al. | |
| 2011/0126110 A1 | 5/2011 | Vilke et al. | |
| 2011/0173028 A1 | 7/2011 | Bond | |
| 2011/0214124 A1* | 9/2011 | Ferris | G06F 8/63 718/1 |
| 2011/0296000 A1 | 12/2011 | Ferris et al. | |
| 2012/0059917 A1 | 3/2012 | Dawson et al. | |
| 2012/0226808 A1 | 9/2012 | Morgan | |
| 2012/0265561 A1 | 10/2012 | Patro | |
| 2012/0278229 A1 | 11/2012 | Vishwanathan et al. | |
| 2012/0278439 A1 | 11/2012 | Ahiska et al. | |
| 2013/0013533 A1 | 1/2013 | Agarwal et al. | |
| 2013/0085892 A1 | 4/2013 | Golden et al. | |
| 2014/0109046 A1 | 4/2014 | Hirsch et al. | |

FOREIGN PATENT DOCUMENTS

| | | |
|---|---|---|
| CN | 104115177 A | 10/2014 |
| EP | 2761555 A | 8/2014 |
| EP | 2761558 A | 8/2014 |
| GB | 2426362 | 11/2006 |
| JP | 2003-44602 | 2/2003 |
| JP | 2007-149096 A | 6/2007 |
| JP | 2010-277187 A | 12/2010 |
| JP | 4743726 B1 | 8/2011 |
| WO | WO 2005/072342 A2 | 8/2005 |
| WO | WO 2013/049393 | 4/2013 |
| WO | WO 2013/049395 | 4/2013 |

OTHER PUBLICATIONS

Ebay, Inc.; Ebay Advertising Targeting homepage. 2012. Accessed Feb. 17, 2012. http://www.ebayadvertising.com/en/display-ads-targeting. 1 pg.

International Search Report and Written Opinion in PCT/US2012/057624 mailed Dec. 6, 2012.

International Search Report and Written Opinion in PCT/US2012/057626 mailed Dec. 24, 2012.

Ranganathan et al. Advertising in a Pervasive Computing Environment, University of Illinois, 5 pages, Urbana, IL.

Shimizu, Masato, Amazon EC2/S3/EBS, Virtual server construction by cloud computing, $1^{st}$ edition, Socym Co., Ltd., Shoichiro Takeda, Aug. 27, 2009, p. 128-138.

Doumae, K. Cloud in Japan—II Probation into Ability of GIO, Chapter 1—Cloud in Japan and IIJ GIO, G-Cloud Magazine, Japan, K.K. Gijutsu Hyoronsha, Sep. 10, 2010, pp. 100-101.Sep. 10, 2010; pp. 100-101.

Taniguchi, T., Cloud in Japan—II Probation into Ability of GIO, Chapter 2—Using IIJ Cloud: It's Simple! Establishing the Web Server by Using the GIO Hosting Package, G-Cloud Magazine, Japan, K.K. Gijutsu Hyoronsha, Sep. 10, 2010, pp. 102 109.

Taniguchi, T., Cloud in Japan—II Probation into Ability of GIO, Chapter 3—Full-Scale! Example of Structuring Using GIO Component Service—Encouraging Full-Scale Cloud Infrastructure with Parts Selected and Used, G-Cloud Magazine, Japan, K.K. Gijutsu Hyoronsha, Sep. 10, 2010, pp. 110 117.

International Preliminary Report on Patentability in PCT/US2012/057624 Apr. 1, 2014.

Supplementary Search Report in European Application No. 12834770.5 dated Apr. 10, 2015.

Office Action received in Japanese Application No. 2014-533330 dated Mar. 2, 2015.

Office Action received in Australian Application No. 2012315939 dated Mar. 10, 2015.

Office Action received in Singapore Application No. 2014012645 dated Mar. 27, 2015.

Office Action received in Canadian Application No. 2850008 dated May 19, 2015.

Office Action received in Australian Application No. 2012315941 dated Mar. 10, 2015.

Office Action received in Japanese Application No. 2014-533331 dated Feb. 23, 2015.

Supplementary Search Report received in European Application No. 12835825.6 dated Jul. 14, 2015.

Office Action received in Canadian Application No. 2,850,011 dated Sep. 1, 2015.

Office Action received in Australian Application No. 2012315939 dated May 19, 2015.

Notification of Grant received in Singapore Application No. 2014012645 dated Feb. 26, 2016.

Office Action received in Chinese Application No. 201280047426.1 dated Apr. 29, 2016.

* cited by examiner

CUSTOMIZABLE UNIFORM CONTROL USER INTERFACE FOR HOSTED SERVICE IMAGES

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit, of the general public.

To facilitate increased utilization of data center resources, virtualization technologies allow a single physical computing device to host one or more instances of a virtual machine, which virtual machine instance appears to a user of a data center as an independent computing device. With virtualization, the host computing device can create, maintain, delete, or otherwise manage virtual machines instances in a dynamic manner. In turn, users can request computing resources from the data center, including single computing devices, a configuration of networked computing devices, and memory, and be provided with virtual machine instances that provide the requested computing resources.

An instance of a virtual machine may be configured to provide specific functionality. For example, a virtual machine instance may be associated with different combinations of software applications and operating systems or operating system configurations to enable a virtual machine to provide different desired functionalities, or to provide similar functionalities more efficiently. One or more virtual machine instance configurations are often contained within a service image, which a host computing device may execute in order to implement the desired specific functionality of the virtual machine instance.

In one embodiment, the service image, when executed by a virtual machine instance, provides a network accessible service (a.k.a. Web service) corresponding to the software applications/configurations included in the service image. A network accessible service provides specific functionality to other applications and computing resources via a network through application programming interfaces (APIs), which APIs can also be considered a network accessible service or Web service. For example, a service image, when executed, may provide a network accessible database or mass storage service. Once a service image is created, it can be provided to users interested in utilizing computing resources available from a data center for specific purposes.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
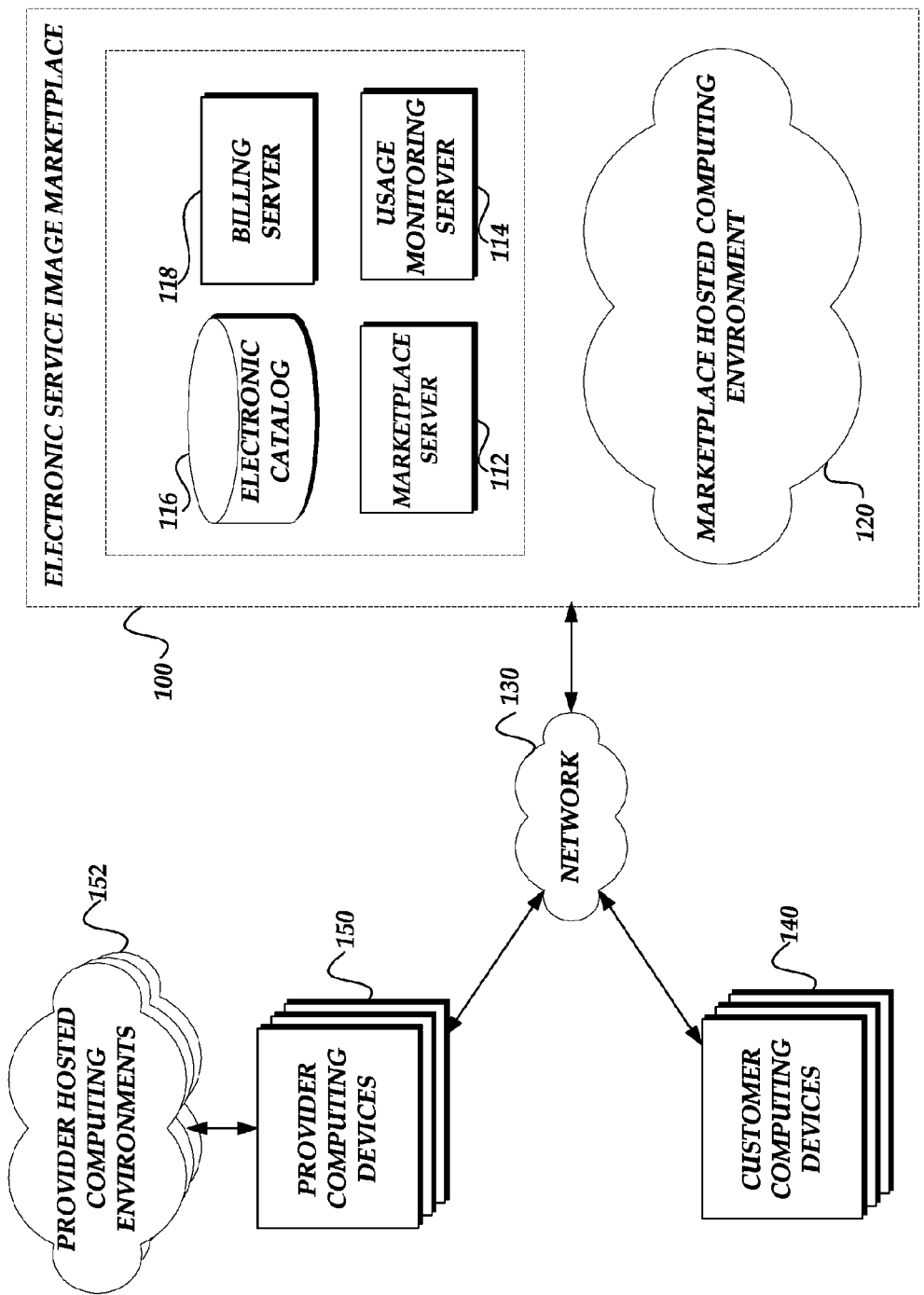
FIG. 1 is a block diagram depicting an illustrative operating environment in which an electronic service image marketplace enables customers to browse and acquire service images made available in the marketplace by third party providers and the operator of the electronic service image marketplace.

Generally described, aspects of the present disclosure relate to providing an electronic marketplace for service images. More specifically, an electronic service image marketplace is disclosed that enables customers to browse and acquire a large variety of service images. The service images may be submitted to, and made available from, the electronic service image marketplace, by third party providers or may be submitted to the marketplace by the operator of the marketplace itself. Once acquired through the marketplace, a service image may be launched on a hosted computing environment maintained by the third party provider of the service image or on a hosted computing environment associated with the marketplace.

The electronic service image marketplace provides an environment with which both providers and customers of service images can interact via a network. As described in greater detail below, providers and customers may interact with the electronic service image marketplace via one or more interfaces. In an embodiment, the interfaces can include user interfaces that are generated by an electronic marketplace server and presented on a computing device associated with a provider or customer. In another embodiment, the interfaces can include a set of application programming interface (API) commands. The electronic service image marketplace may also generate a control interface that includes one or more uniform control objects that can be associated with a service image submitted by a provider. The uniform control objects can provide uniform functionality to each customer associated with a particular service image, and can provide similar functionality to all customers. For example a standard set of uniform control objects can be provided as part of a control interface to every customer that has acquired a service image. The control interface can be implemented as a control user interface, or as a set of API commands. The functionality of the standard set of uniform control objects across service images can be customized for each service image based on different instruction sets received from providers. Alternatively, a set of uniform control objects may be provided as part of a control interface to customers associated with service images of a certain type (e.g., database, web server, storage, etc.), customers that have paid a predefined price, and/or customers associated with service images that have related notifications from the provider, etc. In addition, providers may submit customized control objects that are to be associated with only one service image or only those service images submitted by the provider. Embodiments of an electronic marketplace for service images may be found in U.S. patent application Ser. No. 13/248,227, filed on Sep. 29, 2011, and entitled, "ELECTRONIC MARKETPLACE FOR HOSTED SERVICE IMAGES," the entirety of which is hereby incorporated by reference (the "'227 application").

In one embodiment, a provider may submit a service image to the service image marketplace for inclusion in a service image catalog. The provider may submit additional information corresponding to the service image that would be useful to a customer, such as pricing information, usage conditions, a location of a provider hosted computing environment on which the service image can be hosted, or other information. In addition, the provider may submit an instruction set that can be associated with a particular uniform control object and a particular service image. The uniform control objects can include buttons, dials, knobs, links, interactive areas, API commands, scripts, and the like that form generated as part of a control interface. The instruction set can proscribe actions that a computer resource associated with the particular service image will perform when an interaction occurs with the particular uniform control object. For example, a provider (e.g., Provider1) may submit an instruction set (e.g., instructionSet1) that is to be associated with a service image (e.g., Database1). The instructionSet1 can include instructions that determine how the associated computer resource will "pause," "terminate," and/or "modify" Database1. For example, "modifying" Database1 may include modifying storage capacity, the number of processors used, processing speed, etc. The instructionSet1 can be associated with a "Pause" object, a "Terminate" object, and a "Modify" object, that are generated as part of a control user interface for a customer (e.g., Customer1). Alternatively, the "Pause" object, "Terminate" object, and "Modify" object can be implemented as API commands, scripts, and the like. Customer1 can interact with the different objects using a script, API command, clicking or selecting a user interface, etc. When Customer1 interacts with the different objects, the corresponding instructions can be executed by the computer resource.

Multiple instructions sets from providers can be associated with each uniform control object, and providers can customize the functionality of the uniform control objects as desired. With continued reference to the example, a second provider (e.g., Provider2) can submit another instruction set that is to be associated with a different service image (e.g., webServer2). Similar to instructionSet1, instructionSet2 can include instructions that determine how the associated computer resource will "pause," "terminate," and/or "modify" webServer2. However, the "pause," "terminate," and/or "modify" functions in instructionSet2 can vary significantly from the same functions in instructionSet1. For example "modifying" webServer2 can include modifying the amount of service requests that webServer2 can handle, modifying the content of webServer2, etc. The various instructions from instructionSet2 can be associated with the same "Pause", "Terminate", and "Modify" objects as instructionSet1. When a customer interacts with one of the uniform control objects, the electronic service image marketplace can identify which instruction should be executed based one which service image is identified by the control interface.

In addition, a provider can submit an instruction set that can be associated with a customized control object and form part of the control interface. The customized control object may be associated with only one service image. For example, Provider2 may submit an instruction set (e.g., instructionSet3) that is to be associated with a customized control object (e.g., "Server Statistics" object) and form part of the control interface. The instructionSet3 can include executable code that determines what and how the associated computer resource will display the server statistics of webServer2. The "Server Statistics" object can be an object that is associated with only webServer2 or other service images submitted by Provider2.

Customers may browse the service image catalog by interaction with various user interfaces generated by the service image marketplace as described in more detail below. Upon identifying a service image of interest, the customer may view details of each service image in the service image catalog, such as the information submitted by the provider of the service image. In some embodiments, a customer may view further information associated with a service image, such as usage statistics by other marketplace customers of the service image, reviews by other customers, or recommendations for similar or complementary service images. Accordingly, service images may be surfaced to customers in a variety of ways by the electronic service image marketplace, such as by navigation through a browse tree of services organized by function, type, size, etc. or through recommendations, reviews, etc.

Once a customer selects a service image, the customer may purchase or otherwise acquire the service from the service image marketplace. In some embodiments, the customer may be required to submit payment information for the service image prior to launch of the service image. After acquisition of the service image by the customer, the service image may be launched and executed by one or more hosted computing environments. The hosted computing environment may be provided by an operator of the service image marketplace or may be otherwise associated with the electronic service image marketplace. In some embodiments, the third party provider of the acquired service image may provide a hosted computing environment for the service image acquired by the customer via the electronic service image marketplace.

Once the service image is launched and running on a hosted computing environment, the electronic service image marketplace can monitor the usage of functionality or services provided by service image and bill the customer/pay the provider accordingly. Moreover, the electronic service image marketplace may provide the customer with tools to manage, monitor, modify, etc. the service image. For example, the customer may monitor their own usage of a particular service image and interact with the marketplace and a particular service image via one or more of interfaces or user interfaces, each of which may include one or more uniform control objects. With continued reference to the example above, Customer1 can acquire Database 1 and webServer2 and desire to modify Database1. Customer1 can interact with the "Modify" object of the control interface for Database1 by, for example, moving a cursor over the "Modify" object, clicking or pressing on the "Modify" object, moving the "Modify" object, entering an API command, executing a script, etc.

Following an interaction with a particular uniform control object, a computing resource within the hosted computing environment upon which the service image is executed, can execute the instruction set that is associated with the particular service image and the particular uniform control object to perform the action designated by the instruction set. With continued reference to the example above, following the interaction with the "Modify" object of the control interface, the computer resource may generate a user interface that allows Customer1 to modify Database1 . For example, Customer1 may, using the generated user interface, be enabled to increase or decrease the storage capacity of Database1 , increase or decrease the amount of processing power or speed being used to execute Database1 , etc. Alternatively, the computer resource may allow Customer1 to modify Database1 using the control interface and/or not generate any user interface. The implementation of what and how components of Database1 can be modified by Customer1 can be determined by instructionSet1 submitted by Provider1.

As an example, and not to be construed as limiting, the electronic service image marketplace may make available to providers a "Pause" command as a uniform control object for service images implementing a database. The "Pause" command may be implemented as a "Pause" button for a user interface, an API command, script, and the like. Accordingly, the electronic service image marketplace may receive a first service image implementing a database from a first provider and a second service image implementing a database from a second provider. The electronic service image marketplace may also receive from the first provider, a first instruction set associated with the first service image that relates to the "Pause" command. The first instruction set may provide the instructions that will be executed when a customer that has acquired the first service image interacts with the "Pause" command. For example, when executed, the instructions may cause the computing resource within the hosted computing environment upon which the service image is executed to store current operation settings and values in a register, output the status of any projects, and then cease execution. Upon receiving the first instruction set, the electronic service image marketplace can associate the first instruction set with the uniform control object for the "Pause" command, and the first service image.

Similarly, a second instruction set received from the second provider may include instructions that will be executed when a customer that has acquired the second service image interacts with the "Pause" command. For example, when executed, the second instruction set may cause the computing resource within the hosted computing environment upon which the service image is executed to save and close all applications and enter a hibernation state. The electronic service image marketplace can associate the second instruction set with the uniform control object for the "Pause" command and second service image. As additional service images that relate to databases and additional instruction sets related to the uniform control object for the "Pause" command are received, the electronic service image marketplace can associate each instruction set with the control object for the "Pause" command. Each instruction set can include different instructions and different methods for carrying out a "Pause" operation. Accordingly, the "Pause" command can be associated with different instruction sets that perform a "pause" function in different ways.

Later, a customer may acquire the first service image. The customer may view details regarding the first service image via an interface, such as a user interface or other interface. When viewing the details of the first service image, the user interface may also include the "Pause" command as a uniform control object. The customer can select the "Pause" command on the user interface by interacting with the user interface. Alternatively, the user can select the "Pause" command by executing a script or implementing an API command, etc. Upon selecting the "Pause" command, the computing resource within the hosted computing environment upon which the service image is executed can execute the first instruction set by storing current operation settings and values in a register, outputting the status of any projects, and then ceasing any further execution. Should the customer acquire the second service image and select the "Pause" command when viewing information related to the second service image, the computing resource can execute the second instruction set. Accordingly, the "Pause" command can be included in multiple control interfaces for service images that relate to a database, however, the instructions executed once there is an interaction with the "Pause" command can vary based on an identified service image.

Embodiments discussed below may refer to the users of an electronic marketplace for service images as customers. However, it may be understood that users are not limited to customers but may include owners, administrators, end users and providers of service images purchased from the electronic service image marketplace. While specific embodiments and example applications of the present disclosure will now be described with reference to the drawings, these embodiments and example applications are intended to illustrate, and not limit, the present disclosure.

FIG. 1 is a block diagram depicting an illustrative operating environment in which an electronic service image marketplace 100 enables customers to browse and acquire service images made available in the marketplace by third party providers or the operator of the electronic service image marketplace. As illustrated in FIG. 1, the operating environment includes one or more provider computing devices 150 and one or more customer computing devices 140 in communication with an electronic service image marketplace 100 via a network 130. A third party provider, using a provider computing device 150, may submit via the network 130 a service image for a specific type of functionality to the electronic service image marketplace 100. The electronic service image marketplace 100 may then make the submitted service image, as well as other service images submitted to the marketplace, available to customers.

Accordingly, a customer, using a computing device 140, may browse the service images available from the electronic service image marketplace 100, acquire a desired service image, and launch the acquired service image in a marketplace hosted computing environment 120 operated, maintained, provided or otherwise associated with the operator of the electronic service image marketplace 100. In some cases, where the acquired service image was submitted to the electronic service image marketplace 100 by a third party provider, the acquired service image may be launched in a provider hosted computing environment 152 that is operated, maintained, provided or otherwise associated with the third party provider.

A hosted computing environment may include a collection of rapidly provisioned and released computing resources hosted in connection with the marketplace or a third party provider. The computing resources may include a number of computing, networking and storage devices in communication with one another. In some embodiments, the computing devices may correspond to physical computing devices. In other embodiments, the computing devices may correspond to virtual machine instances implemented by one or more physical computing devices. In still other embodiments, computing devices may correspond to both virtual computing devices and physical computing devices. One example of a hosted computing environment is given in U.S. Pat. No. 7,865,586, entitled "CONFIGURING COMMUNICATIONS BETWEEN COMPUTING NODES" and issued Jan. 4, 2011, which is hereby incorporated by reference in its entirety. A hosted computing environment may also be referred to as a cloud computing environment.

Though described herein with reference to hosted computing environments associated with a provider of a service image and with the electronic service image marketplace 100, in some embodiments, additional hosted computing environments may be utilized. For example, a customer computing device 140 may provide a customer hosted computing environment (not shown), or a third party may provide a third party hosted computing environment (not shown). Any or all of these additional hosted computing environments may be accessible to the electronic service image marketplace 100, and may be utilized to host service images available from the electronic service image marketplace 100. For purposes of brevity, such additional hosted computing environments may also be referred to herein as "provider hosted computing environments."

The provider computing devices 150 and the customer computing devices 140 may communicate with the electronic service image marketplace 100 via a network 130. A provider computing device 150 or customer computing device 140 may be any computing device, such as a laptop or tablet computer, personal computer, server, personal digital assistant (PDA), hybrid PDA/mobile phone, mobile phone, electronic book reader, set-top box, camera, digital media player, and the like. Those skilled in the art will appreciate that the network 130 may be any wired network, wireless network or combination thereof. In addition, the network 130 may be a personal area network, local area network, wide area network, cable network, satellite network, cellular telephone network, or combination thereof. In the illustrated embodiment, the network 130 is the Internet. Protocols and components for communicating via the Internet or any of the other aforementioned types of communication networks are well known to those skilled in the art of computer communications and thus, need not be described in more detail herein.

In the illustrated embodiment, the electronic service image marketplace 100 is illustrated as a computer environment including several computer systems that are interconnected using one or more networks. More specifically, the service image marketplace may include a marketplace server 112, a usage monitoring server 114, an electronic catalog 116, and a billing server 118. Each of these will be described in more detail below. However, it will be appreciated by those skilled in the art that the electronic service image marketplace 100 could have fewer or greater components than are illustrated in FIG. 1. In addition, the electronic service image marketplace 100 could include various Web services and/or peer-to-peer network configurations. Thus, the depiction of the electronic service image marketplace 100 in FIG. 1 should be taken as illustrative and not limiting to the present disclosure. In addition, functions performed by the individual components of the electronic service image marketplace 100 may be generally referred to as being performed by the electronic service image marketplace 100.

The marketplace server 112 facilitates network submission by third party providers, and browsing and acquisition by customers, of service images in the electronic service image marketplace 100. Accordingly, a provider, utilizing a provider computing device 150, may submit one or more service images to the electronic service image marketplace 100 via the marketplace server 112. The submitted service images may then be included in an electronic catalog 116. The process by which a provider, utilizing a provider computing device 150, submits a service image to the electronic service image marketplace 100 will be described in more detail with respect to FIGS. 2 and 3, below.

The electronic catalog 116 includes information on service images available from a plurality of providers and on service images made available by the operator of the electronic service image marketplace 100. In addition, the electronic catalog 116 can include various control objects and instruction sets associated with the control objects. The control objects may be uniform control objects that are associated with one or more service images, groups of service images, types of service images, etc., or the control objects may be customized control objects that are associated with just one service image or service images from a specific provider. The control objects may include, but are not limited to, buttons, dials, knobs, links, interactive areas, API commands, scripts, function calls, and the like.

The uniform control objects can be provided by the electronic service image marketplace 100 to providers and customers. The providers can user the uniform control objects to prepare instruction sets to be associated with the uniform control objects. The customers can use the uniform control objects to manage acquired service images. A uniform control object can include any control object that the electronic service image marketplace 100 provides to a group of customers as designated by the electronic service image marketplace 100. For example, the uniform control objects may include, but are not limited to, a "Pause" object, a "Terminate" object, an "Upgrade" object, a "scale up/down" object, etc. The electronic service image marketplace 100 can provide the uniform controls as part of a standardized interface, user interface, etc. For user interfaces, the electronic service image marketplace 100 may vary which uniform control objects are displayed as part of the standard user interface based on a type of service image, whether a service image is currently executing, etc. For example, database service images may include three uniform control objects, while storage device service images may include five uniform control objects, etc. Furthermore, a database service image that is currently executing may include three uniform control objects, while a database service image that is not currently executing may only include two uniform control objects.

Customized control objects can be submitted by individual providers. A customized control object can include any control object that the electronic service image marketplace 100 associates with only one service image or that has been submitted by a provider. For example, a provider may submit a "View Performance" or "View Graph" object that is not a standard control object, but that would be included in a user interface associated with the provider's service image generated by the electronic service image marketplace 100 and presented to a customer computing device 140.

The instruction sets can be submitted by the provider and then associated with the appropriate control objects and service images by the electronic service image marketplace 100. For example, a provider of a database service image may submit instruction sets for various uniform control objects, such as "Pause," "Upgrade," "Scale Up/Down," in conjunction with a database service image. The electronic service image marketplace 100 can associate the instruction sets with the appropriate uniform control object and with the database service image. The electronic service image marketplace 100 can then store the database service image and the instruction sets along with the uniform control objects in the electronic catalog 116. In addition, the electronic service image marketplace 100 can store the associations between the uniform control objects, database service image, and the instruction sets in the electronic catalog 116. Any customized control objects can also be stored by the electronic catalog 116.

With continued reference to FIG. 1, the marketplace server 112 may obtain service image information for service images offered by a plurality of providers via the electronic service image marketplace 100 and make the service images available to a customer from a single network resource, such as a Web site. A customer may then acquire the service image from the electronic service image marketplace 100 and launch the service image in a hosted computing environment (e.g., the marketplace hosted computing environment 120 or a provider hosted computing environment 152) in a single interaction or order placed with the service image marketplace. This eliminates the need for the customer to develop his or her own service image; or research, search or otherwise investigate multiple different providers or other sources for the service image. The electronic catalog 116 may be a catalog containing information regarding both items (such as goods and services) and service images, or may be separate catalogs, with one catalog containing information regarding items and the other catalog containing information regarding services images, without departing from the scope of the present disclosure.

Illustratively, marketplace server 112 may generate one or more user interfaces through which a customer, utilizing a customer computing device 140, may browse service images, submit queries for matching service images and view information and details regarding specific service images. In addition, the marketplace server 112 may generate one or more control user interfaces that include one or more uniform control objects through which a customer may manage acquired service images. Furthermore, the marketplace server 112 may provide one or more control interfaces to a customer that include commands to execute one or more uniform control objects.

After the customer selects a desired service image from the electronic service image marketplace 100, the marketplace server 112 may facilitate the configuration and acquisition of the service image and cause the launching of the service image on a hosted computing environment. In this regard, the marketplace server 112 may receive payment information from the customer computing device 140, as well as information specifying how the service image should be implemented by a hosted computing environment. In some embodiments, the customer may select a specific hosted computing environment to host the selected service image. The specific hosted computing environment may correspond, for example, to the marketplace hosted computing environment 120 associated with the electronic service image marketplace 100, or to a provider hosted computing environment 152 which is associated with the provider of the service image.

Once the service image is launched and running on a hosted computing environment, the electronic service image marketplace 100 can monitor the usage of functionality or services provided by service image and bill the customer/pay the provider accordingly via the usage monitoring server 114 and the billing server 118, respectively. Moreover, the service image marketplace may provide the customer with tools to manage, monitor, modify, etc. the service image. These tools may be in the form of the uniform and customized control objects described above. Based on which service image is launched and running, different control objects can be displayed or interacted with. In addition, based on which service image is selected, interactions with the uniform control objects can cause the computing resource to execute different instructions. In the illustrated example, the usage monitoring server 114 is in communication with the marketplace hosted computing environment 120, and is operable to track a usage of the functionality (e.g., Web service) provided by the executed service image. This may be required, for example, where pricing of the service image is dependent on usage of the Web services produced by the service image when executed.

The billing server 118, on the other hand, may be provided to process payments from customers and, in some embodiments, provide payment to the providers of acquired service images. The billing server 118 may receive and provide payment information via interaction with the marketplace server 112. In some embodiments, the billing server 118 may alternatively receive and provide payment information via other processes, such as via an additional server, via telephonic interaction, or other mechanisms.

Figure 2:
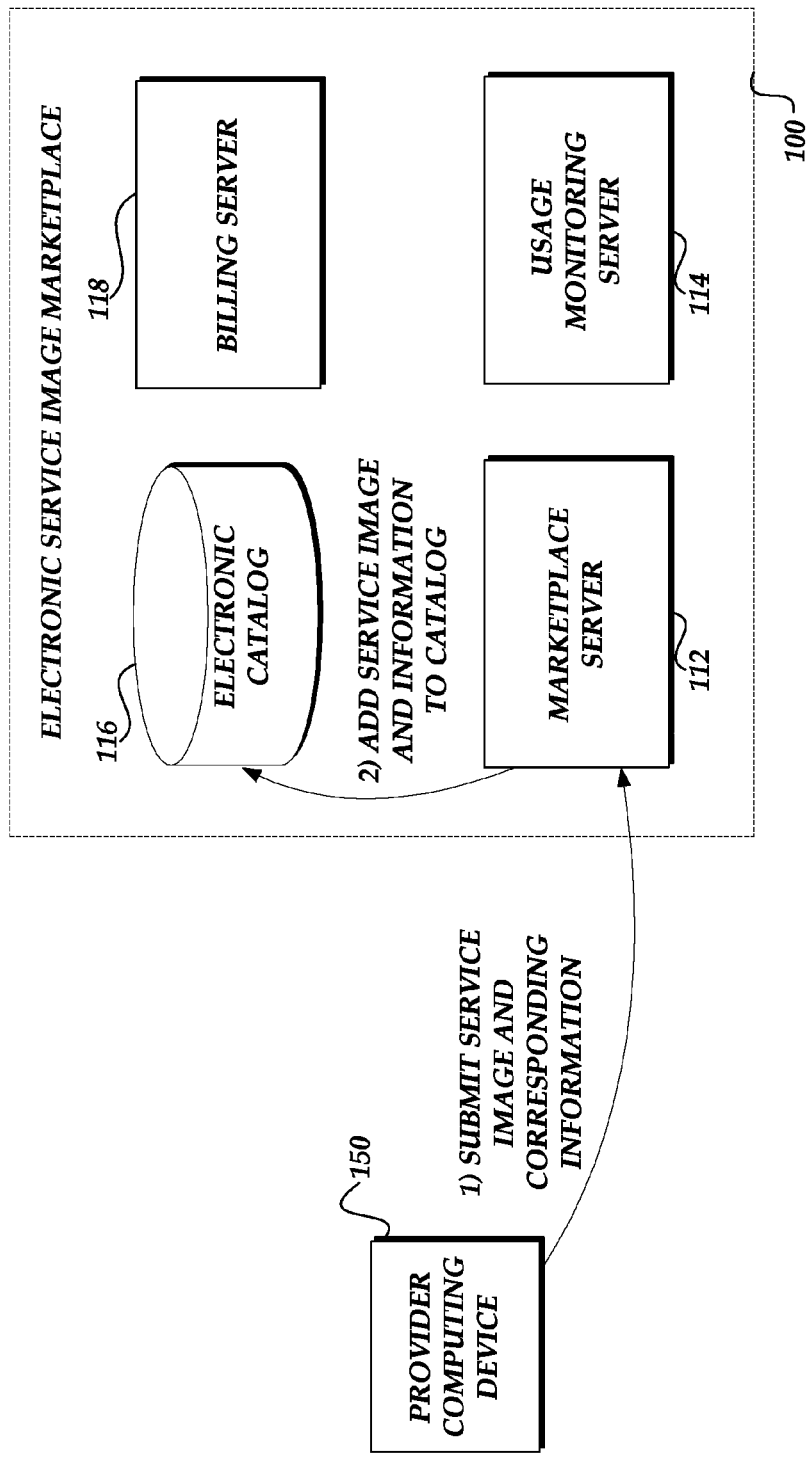
FIG. 2 is a block diagram depicting a provider computing device submitting a service image for inclusion in the service image marketplace shown in FIG. 1.

With reference to FIG. 2, an illustrative interaction for allowing a provider computing device 150 to submit a service image to the electronic service image marketplace 100 will be described. As depicted in FIG. 2, the provider computing device 150 submits a service image and information corresponding to that service image to the electronic service image marketplace 100 where the submission is processed by the marketplace server 112. The provider, utilizing the provider computing device 150, may submit information such as the name of a service image, the entity which generated the service image, software contained within the service image, or a description of the service image or software contained therein. The entity or provider may submit pricing information corresponding to the service image or use of the service image. Such pricing information may, by way of example, correspond to a one-time price for acquisition of the service image, to a monthly subscription fee associated with the service image, or to a usage fee associated with a time period of use of the service image. For example, the submitted pricing information may reflect a monthly subscription fee for acquisition of the service image in addition to an hourly usage fee for use of the service image. A provider computing device 150 may optionally submit usage restrictions associated with a provided service image, such as required acceptance of an end user license agreement ("EULA"), maximum usage restrictions, or type of usage restrictions, such as limitations allowing only non-commercial use. In addition, the provider can submit instruction sets that are to be associated with the submitted service image and the uniform control objects stored in the electronic catalog 116. Along with the instruction sets, the provider can submit customized control objects and the instruction sets associated with the customized control objects.

Subsequent to submission of the service image and any corresponding information received from the provider computing device 150, the marketplace server 112 may interact with the electronic catalog 116 in order to store the service image and the corresponding information. The electronic catalog 116 may be implemented as a comprehensive catalog of service images that are available to a customer via the electronic service image marketplace 100. Though depicted here as a single service image catalog, the marketplace server 112 may interact with a number of distinct service image catalogs in order to store submitted service images and corresponding information. In one embodiment, the electronic catalog 116 is a conventional database stored in one or more memory storage devices. In other embodiments the electronic catalog 116 is associated with a catalog server (not shown) that is responsible for maintaining the comprehensive catalog stored therein. The electronic catalog 116 and/or associated catalog server may be in communication with other servers and databases also storing catalog information for service images available via the electronic service image marketplace 100. For example, such servers and databases may be operated by different providers and thus, may include various catalog information for service images offered by those providers.

In some embodiments, submission of a service image may not necessarily result in inclusion of the service image or the instruction sets in the electronic catalog 116. For example, the electronic service image marketplace 100 may have automated or manual oversight routines for reviewing a service image and instruction sets before inclusion in the electronic catalog 116. Such a review of a service image and instruction sets may result in further communication between the electronic service image marketplace 100 and the provider (not shown) prior to adding the service image to the electronic catalog 116, or may result in not including the service image in the electronic catalog 116.

Though described above with reference to a service image, in some embodiments, the provider may, instead of providing a service image, provide one or more service image components. Such a service image component may correspond to, for example, an application that may be contained within a service image or an instruction set. In these embodiments, service image components may be stored within the electronic catalog 116, and selected by customers of the electronic service image marketplace 100 for purchase. The electronic service image marketplace 100 may be configured to create a service image in response to a selection to one or more service image components by a customer.

Figure 3:
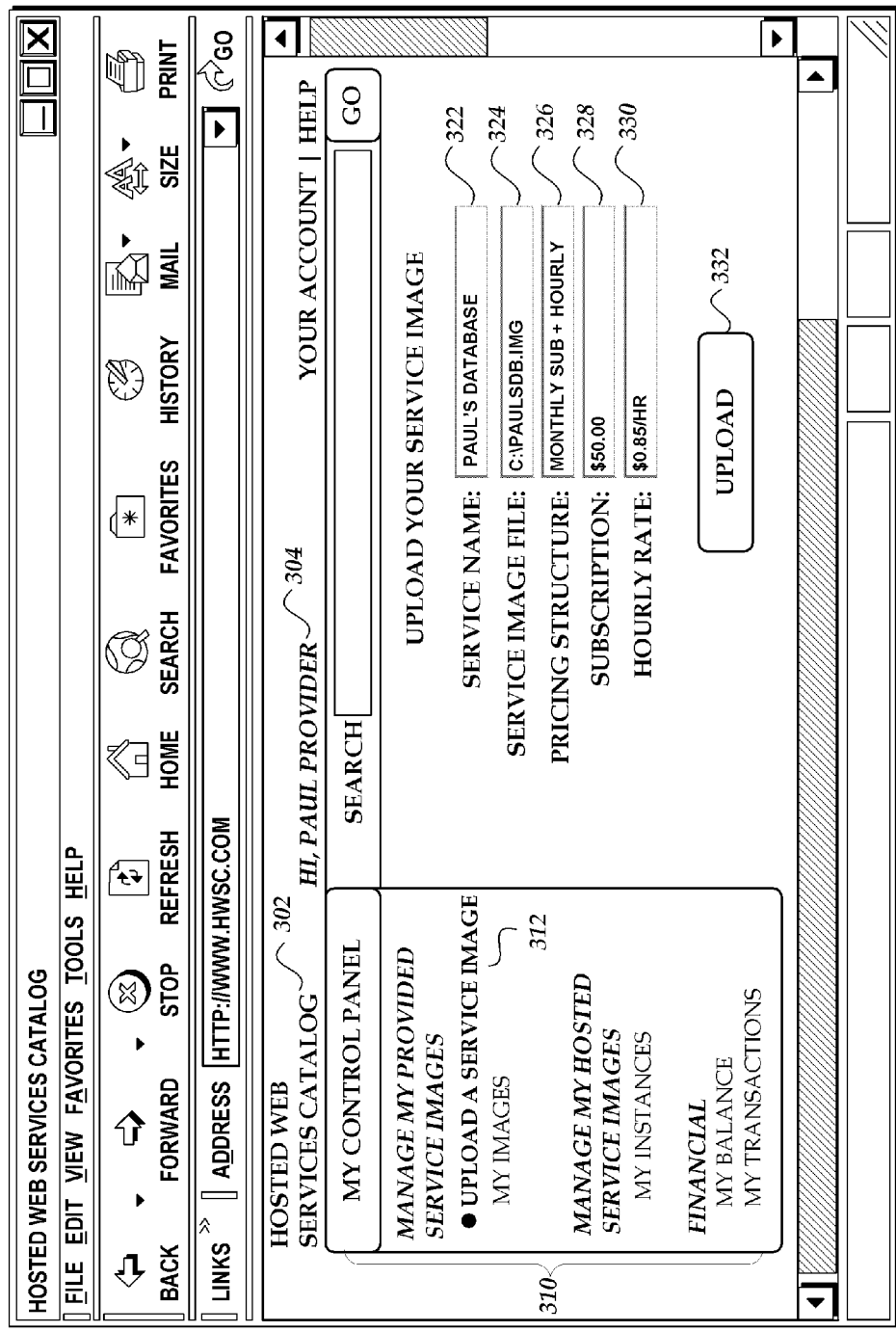
FIG. 3 depicts an illustrative user interface displayed on a provider computing device that enables a provider to submit a service image for inclusion in the service image marketplace shown in FIG. 1.

With reference to FIG. 3, one example of a user interface 300 for provider submission of service images is displayed. As shown in FIG. 3, the user interface 300 enables a provider utilizing a provider computing device, such as provider computing device 150 of FIG. 1, to submit a service image to the electronic service image marketplace 100. Illustratively, the user interface 300 may be generated by the marketplace server 112 of the electronic service image marketplace 100 and presented on the provider computing device 150 by an application, such as a browser application, on the provider computing device 150. In this example, the user interface 300 contains a title reference 302 to the electronic service image marketplace 100, i.e., the "Hosted Web Services Catalog," as well as a salutation 304 to the provider currently visiting the electronic service image marketplace 100. In the illustrated example, the provider is identified as "Paul Provider." The user interface 300 further contains a navigation panel 310, which directs the provider to various other features offered by the electronic service image marketplace 100. Illustratively, units of text within the navigation panel 310 may correspond to interactive links, which modify or change the user interface when selected. In the current example, Paul Provider, has selected link 312, "Upload a Service Image." Based on this selection, the marketplace server 112 has returned the content for user interface 300.

Through the user interface 300 the provider may submit information associated with a service image to the electronic service image marketplace 100. The provider, utilizing a provider computing device 150 may submit, via input box 322, an identifier of the service image to be used by the electronic service image marketplace 100. This may be the name displayed to customers of the electronic service image marketplace 100 when they view, browse, or search the electronic service image marketplace 100. The provider may submit additional information, such as a file location (e.g., a file name or address), and pricing information via inputs 324-330. Input box 324 allows the provider to specify the device image that is to be submitted, and that may thereafter be hosted by a hosted computing environment on behalf of a customer. In the illustrated example, the service image location is a location on the provider computing device 150, as is displayed in FIG. 3. In other embodiments, the service image file may be located on another computing device, such as a computing device within a provider hosted computing environment 152, or a computing device within the marketplace hosted computing environment 120 associated with the electronic service image marketplace 100. The device image may also include the instruction sets that are to be associated with the uniform and customized control objects. Alternatively, separate files that include the instruction sets that are to be associated with the control objects can be uploaded using additional input boxes.

In some embodiments, the electronic service image marketplace 100 may create a service image on behalf of the provider. For example, the provider may, instead of providing a location of a service image via input box 324, specify the location of a computing device. The electronic service image marketplace 100 may then locate the specified computing device, and create a service image reflecting the current software running on and/or current configuration of the computing device. Such functionality may be helpful in situations where the provider wishes to provide a service image of the current state of a computing device which exists within the marketplace hosted computing environment 120.

In the illustrated example, input boxes 326-330 enable a provider to specify pricing information associated with the submitted service image. For example, input box 326 enables the provider to specify a pricing structure associated with a service image such as a pricing structure requiring a monthly subscription rate as well as an hourly usage fee. However, as described above, other or additional pricing structures may be used. By way of non-limiting example, a pricing structure may correspond to a one-time fee, a subscription of any duration of time (e.g., years, months, weeks, etc.) that is required regardless of usage, a usage fee charged only for the time a service image is actually used, a per-use or per-access fee such as a fee associated with every time a service image is loaded, or any other pricing structure. In some embodiments, a service image may be provided free of charge. In other embodiments, pricing information may be dependent on the use of a service image. For example, a higher price may be collected for use of a service image in a commercial environment than would be collected for use of the same service image in a non-commercial or educational environment. As another example, pricing information may specify tiered pricing, such that heavy users of a service image may be charged a lower per-use fee. In still more embodiments, a provider may negotiate individual pricing information to be used for specific customers of a service image or service images. For example, individual contracts may exist or be created between a provider and each customer. One skilled in the art will appreciate that various implementations may accommodate such individualized contracts. For example, the provider may modify pricing information on a per customer basis (such as allowing a specified customer to access unlimited instances without fee).

A provider may further specify parameters for a pricing structure via input boxes 328 and 330, such as the amount of the monthly subscription rate and the hourly usage fee. In some embodiments, input boxes 328 and 330 may only appear when the input of input box 326 indicates they are required. Where input box 326 indicates that different or additional pricing information is required, alternate input boxes may appear. In some embodiments, one or more of the above inputs may not be required. In other embodiments, additional input information may be provided. For example, a provider may specify a graphic which should be associated with the provided service image. After all necessary information has been input, submission may be completed by selecting the input control 332. Accordingly, the provider may activate the input control 332 to cause the provider computing device 150 to transmit the service image and corresponding information to the marketplace server 112. As discussed above, the marketplace server 112 may then submit the received information to the electronic catalog 116.

A customer can submit a query for a service image and use a user interface to display information related to different service images of interest. The customer can purchase and/or acquire the service images stored in the electronic catalog 116, as described in greater detail in the '227 application. In addition, the customer can review details regarding the acquired service images using one or more user interfaces, and can manage one or more service images using a control interface.

Figure 4:
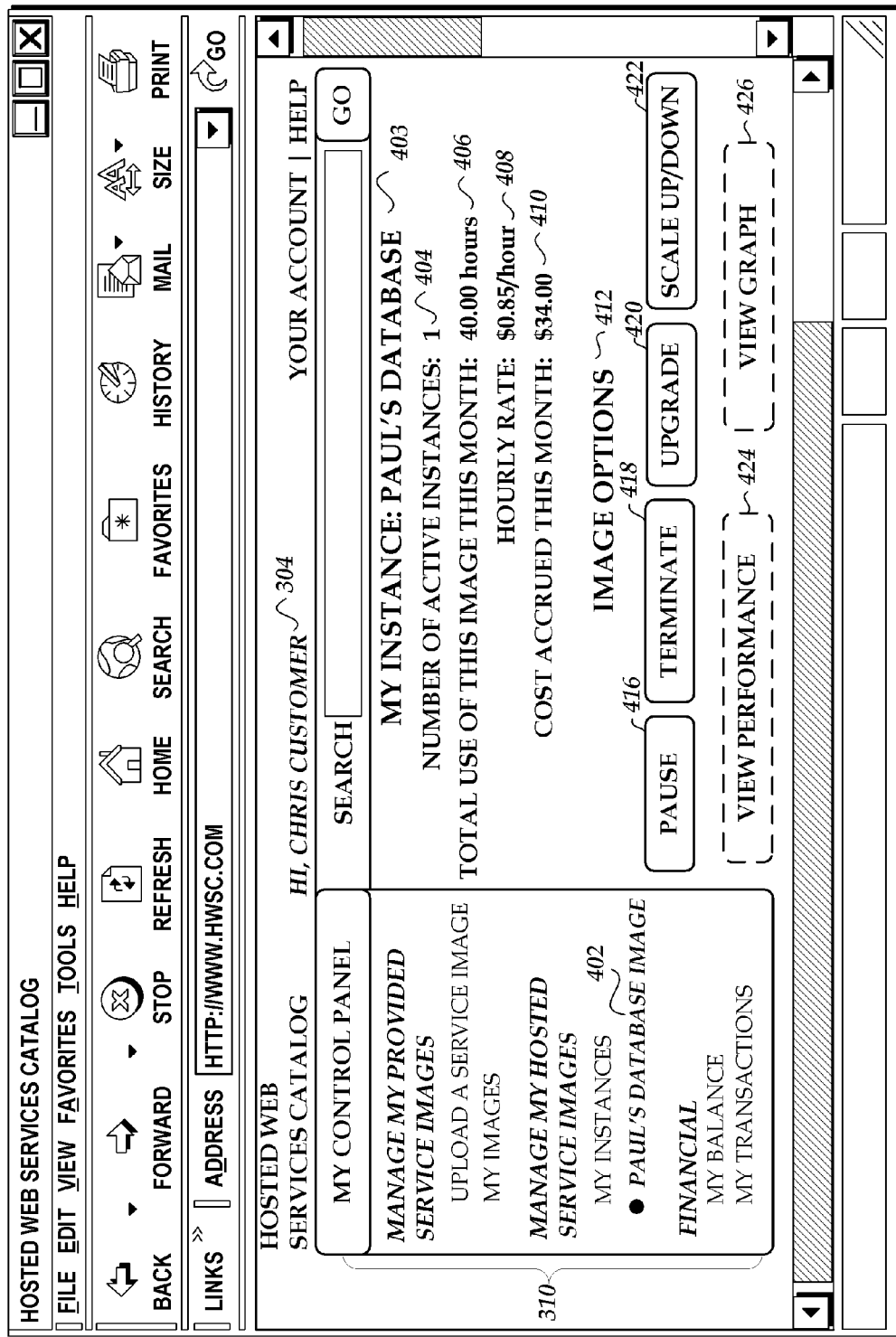
FIG. 4 depicts an illustrative control user interface displayed on a customer computing device that presents additional details regarding a service image acquired by the customer from the service image marketplace shown in FIG. 1, and presents one or more uniform control objects and customized control objects associated with the acquired service image.

FIG. 4 depicts an illustrative control user interface displayed on a customer computing device that presents details regarding a service image acquired by the customer from the service image marketplace shown in FIG. 1, and that presents one or more uniform control objects and customized control objects associated with the acquired service image. The control user interface 400 can be used by a customer to manage, or otherwise control, various aspects of the acquired service image. Although illustrated as a user interface, the control interface can alternatively be implemented as a set of API commands, script, function calls, etc.

As shown in FIG. 4, the control user interface 400 enables a customer to review information regarding services images acquired via the electronic service image marketplace 100, i.e., the "Hosted Web Services Catalog," 302 and to manage the acquired service images. The current user of the "Hosted Web Services Catalog" is Chris Customer 304. A navigation panel 310 directs the customer to various other features offered by the electronic service image marketplace 100. In this illustrative example, Chris Customer has selected the "Paul's Database Image" link 402 of the "My Instances" portion of the navigation panel 310.

Display features 403-414 depict information regarding the corresponding service image. Display feature 403 displays the title of the service image. Display feature 404 reflects the current number of active instances of the service image, while display feature 406 depicts the number of hours the service image has been used for the current month. Display feature 408 depicts the hourly rate associated with usage of the service image, as set by Paul Provider, and display 410 depicts the total cost accrued for the current month. Display 412 displays the service image options for the customer.

Control objects 416-426 provide the customer with a number of management features that can be used to control the service image. The interface objects include both uniform control objects 416-422 that are made available to multiple customers based on parameters determined by the electronic service image marketplace, and customized control objects 424-426 made available to customers of a single service image or customers of service images from the same provider. The parameters for determining which customers may view the uniform control objects may include, the type of service image being used, whether the service image is currently executing, the price paid for the service image, notifications received from a provider as described in greater detail in the '227 application.

As illustrated, the uniform control objects include a "Pause" object 416, a "Terminate" object 418, an "Upgrade" object 420, and a "Scale Up/Down" object 422. Following an interaction with the "Pause" object 416, a computing resource may generally pause or halt whatever operations the service image is performing for later use or review. The "Terminate" object 418 may generally be used to terminate whatever operations the service image is performing without the ability of resuming where the service image left off. The "Upgrade" object 420, may generally be used to upgrade the service image to a newer version. The "Scale Up/Down" object 422 may provide the customer with options of increasing the processing speed or power of the computing resource.

As mentioned previously, interaction with each uniform control object may cause an associated computing resource to execute a generally similar task, but may do so in a significantly different way based on the instruction sets submitted by the provider of the associated service image. For example, the instruction set associated with the "Terminate" object 418 in one service image may cause the current information in any registers, and the status of any current assignments to be stored in a memory device for later retrieval. The "Terminate" object 418 for a different service image may lead to an immediate reset of all registers, status indicators, etc. of the service image. Other service images may implement the "Terminate" object 418 differently. However, the "Terminate" object 418 can be provided to the customers in a similar fashion regardless of the associated instructions. Similarly, the other uniform control object can be provided to multiple customers and implemented differently based on the instruction set submitted by the provider.

The customized control objects illustrated in FIG. 4 include a "View Performance" object 424 and a "View Graph" 426. As mentioned previously, the customized control objects and the instruction sets associated with them are submitted by the providers. The electronic service image marketplace 100 may provide some information for the providers, such as how the customized control objects will be displayed, size, shape, etc., but the determination of what the customized control objects are and how they will function can be determined by the providers. Thus, Paul Provider can determine that Chris Customer can view the performance of the service image using the "View Performance" object 424. The "View Performance" object 424 may allow the customer to view a number of service image diagnostics, such as processing power, processing time for certain tasks, memory usage, etc., as determined by the provider. In addition, Paul Provider may allow Chris Customer to view a graph of any number of parameters associated with Paul's Database using the "View Graph" object 426. For example, Christ Customer may be able to view usage history, processing utilization history, memory use history, trends of use, etc. Although the "View Performance" object 424 and the "View Graph" object 426 have been described as customized control objects, these can be included as uniform interface objects. Likewise, any of the example objects listed as uniform control objects can also be used as customized control objects.

Figure 5:
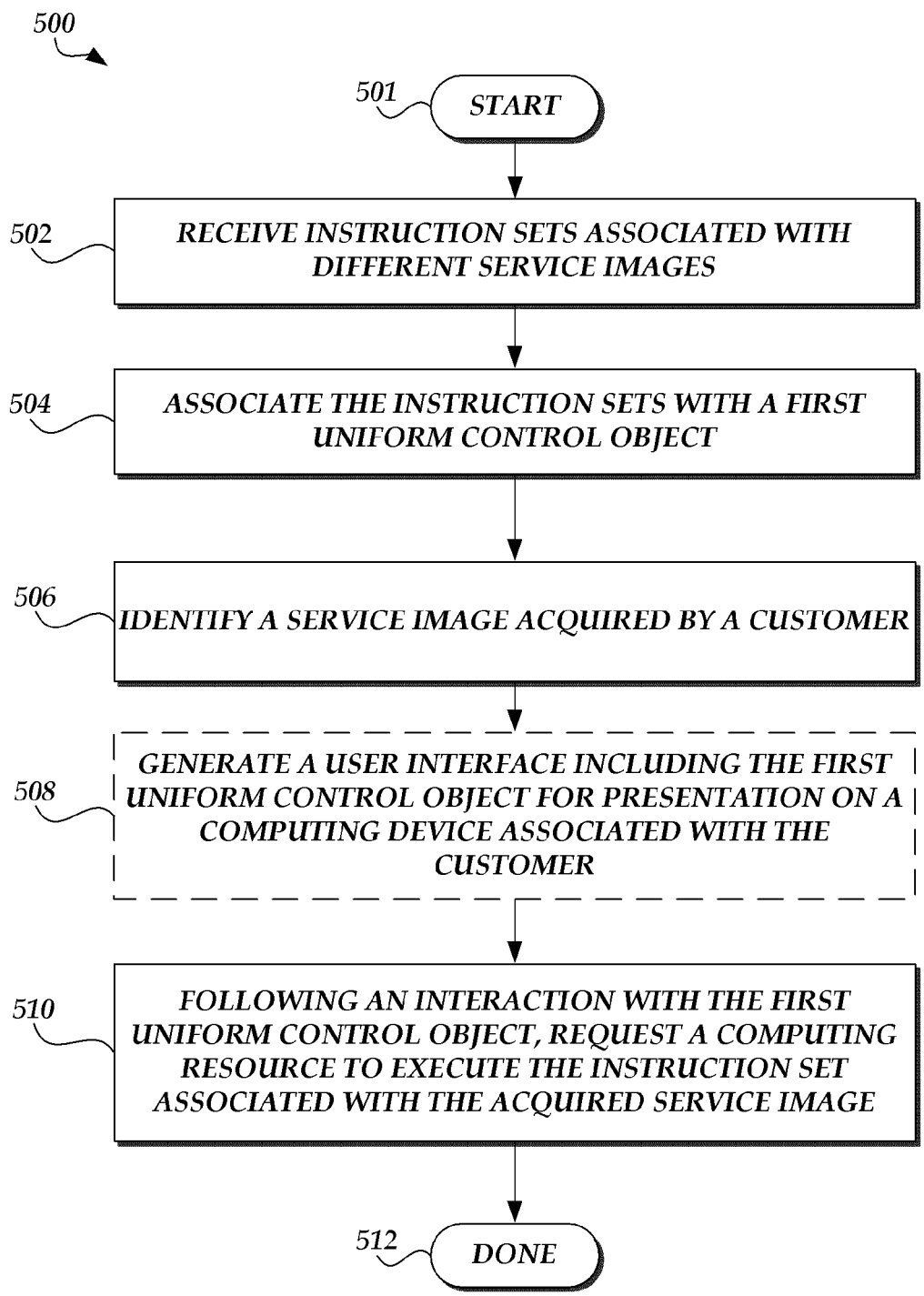
FIG. 5 is a flow diagram depicting an illustrative routine implemented by the marketplace server of the electronic service image marketplace to request a computing resource to execute an instruction set associated with a uniform control object and an acquired service image.

FIG. 5 is a flow diagram depicting an illustrative routine 500 implemented by a marketplace server 112 to implement a uniform control interface for a customer that has acquired a service image. For example, routine 500 can apply to embodiments described in reference to FIGS. 1 and 2.

One skilled in the relevant art will appreciate that the elements outlined for routine 500 may be implemented by one or more computing devices/components that are associated with the marketplace server 112 and/or electronic service image marketplace 100, described in greater detail above with reference to FIGS. 1 and 2. For example, routine 500 can be implemented by any one, or a combination, of marketplace server 112, the usage monitoring server 114, the billing server 118, the electronic catalog 116 and the provider/customer data store 120, and the like. Accordingly, routine 500 has been logically associated as being generally performed by a marketplace server 112, and thus the following illustrative embodiment should not construed as limiting.

At block 502, the marketplace server 112 receives one or more instruction sets associated with different service images from one or more providers. The instruction sets can be received at the same time that a service image is received by the providers or at a different time. Each instruction set can include instructions to be associated with multiple uniform control objects provided by the electronic service image marketplace. Alternatively, each instruction set can include instructions to be associated with only one uniform control object. The instruction sets, when executed, cause a computing resource associated with a service image to perform one or more operations on an associated electronic service image. For example, the instruction sets may activate or deactivate a service image, modify the type of computing resource which is executing the service image, pause the service image, upgrade the service image, downgrade the service image, output the status of the operations being performed by the service image, or change other functions or features associated with the instance, etc. In an embodiment, the instruction set causes the computing resource to generate and send a message to the service image. The message can include indications for the service image to perform any one of the operations listed above, or others.

At block 504, the marketplace server 112 associates one or more of the received instruction sets with a first uniform control object. Thus, the uniform control object, which is provided by the electronic service image marketplace 100, can be associated with multiple instruction sets, which are submitted by providers. As mentioned above, each instruction set can include instructions for implementing an operation associated with the uniform control object in a different way for different service images.

At block 506, the marketplace server 112 identifies a service image acquired by a customer that is associated with the first uniform control object. The marketplace server 112 can identify the acquired service image based on the current information being displayed as part of a user interface, the service images associated with the customer in the electronic catalog, a request for information regarding a particular service image, an API command, a script, function call parameters, and the like.

At block 508, the marketplace server 112 optionally generates a user interface including the first uniform control object for presentation on a computing device 140 associated with the customer. For example, the marketplace can generate a user interface similar to the control user interface 400 of FIG. 4. Alternative user interfaces can be presented without departing from the spirit and scope of the description. The user interface can be generated based on the identified service image acquired by the customer. For example, following an interaction with a user interface in which the customer requests additional information regarding a particular service image, the marketplace server 112 can generate the user interface including the first uniform control object. As part of the user interface, the marketplace server 112 can generate additional uniform control objects and/or one or more customized control objects as desired. The uniform control objects included in the user interface can be based on internal rules of the electronic service image marketplace, such as the type of service image being displayed, the cost of the service image, any notifications received from a provider regarding the service image, and the like.

At block 510, following an interaction with the first uniform control object, the marketplace server 112 requests the computing resource to execute the instruction set associated with the acquired service image. In certain embodiments where a user interface is generated, the interaction can include, but is not limited to, clicking on, moving, highlighting, or otherwise selecting the first uniform control object. In embodiments where a user interface is not generated, the interaction can include, but is not limited to, executing an API command, script, function call, and the like. The marketplace server 112 can request the computing resource to execute the instruction set using a command, a transmitting a message with the relevant information, etc. As mentioned previously, the first uniform control object can be associated with multiple instruction sets. Thus, the instruction set executed by the computing resource can be based on the identified acquired service image.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising: an electronic catalog storing at least:
   a plurality of service images capable of being executed in virtual computing devices within a hosted computing environment to implement functionalities on behalf of customers of the hosted computing environment, wherein each service image comprises at least one software application,
   a uniform control object,
   a first instruction set associated with the uniform control object and with a first service image of the plurality of service images, the first instruction set designated by a provider of the first service image to control virtual computing devices executing the first service image on behalf of individual customers of the first service image, wherein the first instruction set, when executed, causes a computing resource within the hosted computing environment to implement an operation, with respect to the virtual computer devices executing the first service image, by undertaking a first set of actions associated with the first service image, and
   a second instruction set associated with the uniform control object and with a second service image of the plurality of service images, the second instruction set designated by a provider of the second service image to control virtual computing devices executing the second service image on behalf of individual customers of the second service image, wherein the second instruction set, when executed, causes the computing resource to implement the operation, with respect to the virtual computer devices executing the second service image, by undertaking a second set of actions, different from the first set of actions, associated with the second service image; and
   a marketplace computing device comprising a processor and in communication with the electronic catalog, the marketplace computing device configured to:
   generate a first user interface, including the uniform control object, for presentation on a computing device associated with a first customer;
   determine a first virtual computing device on the hosted computing environment that is executing the first service image on behalf of the first customer, wherein the first virtual computing device implements functionality corresponding to the first service image;
   following an interaction of the first customer with the uniform control object of the first user interface, request the computing resource to execute the first instruction set, designated by the provider of the first service image, to perform the operation on the first virtual computing device executing the first service image on behalf of the first customer;
   generate a second user interface, including the uniform control object, for presentation on a computing device associated with a second customer;
   determine a second virtual computing device on the hosted computing environment that is executing the second service image on behalf of the second customer, wherein the second virtual computing device implements functionality corresponding to the second service image and is distinct from the first virtual computing device;
   following an interaction of the second customer with the uniform control object of the second user interface, request the computing resource to execute the second instruction set, designated by the provider of the second service image, to perform the operation on the second virtual computing device that is executing the second service image on behalf of the second customer.

2. The system of claim 1, wherein the computing resource is a computing resource associated with the hosted computing environment.

3. The system of claim 1, wherein the computing resource is a computing resource maintained by at least one of the provider of the first service image or the provider of the second service image.

4. The system of claim 1, wherein the operation implemented by the computing resource with respect to the virtual computer devices executing the first service image on behalf of individual customers of the first service image includes at least one of activating the first service image, deactivating the first service image, modifying a type of computing resource which is hosting the first service image, modifying the computing resource which is hosting the first service image, transmitting a message to the first service image, pausing the first service image, upgrading the first service image, and outputting a status of operations being performed by the first service image.

5. The system of claim 1, wherein:
   the electronic catalog further stores a third instruction set associated with a customized control object and with the first service image;
   the first user interface generated for presentation on the computing device associated with the first customer further includes the customized control object; and
   following an interaction of the first customer with the customized control object, the marketplace computing device is further configured to execute the third instruction set.

6. The system of claim 5, wherein the third instruction set is only associated with the first service image.

7. A computer-implemented method for generating a control interface for customers who have acquired one or more service images from an electronic marketplace, wherein each service image of the one or more service images, when executed on a hosted computing environment, implements one or more network accessible services, the computer-implemented method comprising:
   receiving a first instruction set associated with a first service image of the one or more service images, the first instruction set designated by a provider of the first service image to control virtual computing devices executing the first service image on behalf of individual customers of the first service image, wherein the first instruction set, when executed, causes one or more computing resources within the hosted computing environment to implement an operation, with respect to the virtual computer devices executing the first service image, by undertaking a first set of actions associated with the first service image;

associating, using one or more processors, the first instruction set with a uniform control object;

receiving a second instruction set associated with a second service image of the one or more service images that is different from the first service image, the second instruction set designated by a provider of the second service image to control virtual computing devices executing the second service image on behalf of individual customers of the second service image, wherein the second instruction set, when executed, causes the one or more computing resources within the hosted computing environment that executes the second service image to implement the operation, with respect to the virtual computer devices executing the second service image, by undertaking a second set of actions associated with the second service image;

associating the second instruction set with the uniform control object;

generating, using the one or more processors, a first user interface including the uniform control object for presentation on a computing device associated with a first customer;

determining a first virtual computing device on the hosted computing environment that is executing the first service image on behalf of the first customer, wherein the first virtual computing device implements functionality corresponding to the first service image;

following an interaction of the first customer with the uniform control object, requesting the one or more computing resources within the hosted computing environment to execute the first instruction set, designated by the provider of the first service image, to perform the operation on the first virtual computing device executing the first service image on behalf of the first customer;

generating a second user interface, including the uniform control object, for presentation on a computing device associated with a second customer;

determining a second virtual computing device on the hosted computing environment that is executing the second service image on behalf of the second customer, wherein the second virtual computing device implements functionality corresponding to the second service image and is distinct from the first virtual computing device;

following an interaction of the second customer with the uniform control object of the second user interface, requesting the one or more computing resources to execute the second instruction set, designated by the provider of the second service image, to perform the operation on the second virtual computing device that is executing the second service image on behalf of the second customer.

8. The computer-implemented method of claim 7, wherein performing the operation on the first virtual computing device that is executing the first service image on behalf of the first customer comprises at least one of activating the first service image, deactivating the first service image, modifying a type of computing resource which is hosting the first service image, modifying the computing resource which is hosting the first service image, transmitting a message to the first service image, pausing the first service image, upgrading the first service image, downgrading the first service image, and outputting a status of operations being performed by the first service image.

9. The computer-implemented method of claim 8, wherein modifying the computing resources comprises modifying at least one of processing speed, a number of processors, memory speed and an amount of memory.

10. The computer-implemented method of claim 7, further comprising:

receiving a third instruction set associated with a customized control object, wherein the third instruction set is further associated with the first service image; and following an interaction between a computing device associated with the first customer and the customized control object, executing the third instruction set.

11. The computer-implemented method of claim 10, wherein the third instruction set is only associated with the first service image.

12. The computer-implemented method of claim 7, wherein the first instruction set comprises communication information for communicating with the first service image.

13. The computer-implemented method of claim 7, wherein the uniform control object comprises a button on a web page.

14. A computer-implemented method for generating a control interface for customers who have acquired one or more service images from an electronic marketplace, the computer-implemented method comprising:

associating, using one or more processors, a uniform control object with a plurality of service images from the electronic marketplace, each service image capable of being executed by virtual computing devices within a hosted computing environment;

obtaining a first instruction set associated with a first service image of the plurality of service images, the first instruction set designated by a provider of the first service image to control virtual computing devices executing the first service image on behalf of individual customers of the first service image, wherein the first instruction set, when executed, causes a computing resource within the hosted computing environment to implement an operation by undertaking a first set of actions associated with the first service image;

obtaining a second instruction set associated with a second service image of the plurality of service images, the second instruction set designated by a provider of the second service image to control virtual computing devices executing the second service image on behalf of individual customers of the second service image, wherein the second instruction set, when executed, causes a computing resource within the hosted computing environment to implement an operation by undertaking a second set of actions associated with the second service image;

associating the first and second instruction sets with the uniform control object;

generating a user interface including the uniform control object for presentation on a computing device associated with a customer;

determining a virtual computing device on the hosted computing environment that is executing the first service image on behalf of the first customer, wherein the first virtual computing device implements functionality corresponding to the first service image and is distinct from other virtual computing devices implemented on behalf of other customers; and following an interaction between the computing device associated with the customer and the uniform control object, requesting the computing resource within the hosted computing environment to execute the first instruction set associated with the first service image to implement the operation with respect to the virtual computing device that is executing the first service image on behalf of the first customer.

15. The computer-implemented method of claim 14, wherein the operation implemented by the computing resource includes at least one of activating the first service image, deactivating the first service image, modifying a type of computing resource which is hosting the first service image, modifying the computing resource which is hosting the first service image, transmitting a message to the first service image, pausing the first service image, upgrading the first service image, downgrading the first service image, and outputting a status of operations being performed by the first service image.

16. The computer-implemented method of claim 14, further comprising:
   receiving a third instruction set associated with a customized control object, wherein the third instruction set is further associated with the first service image; and
   following an interaction between the computing device and the customized control object, executing the third instruction set.

17. The computer-implemented method of claim 16, wherein the third instruction set is only associated with the first service image.

18. A computer-readable, non-transitory storage medium having computer-executable instructions for generating a control interface for a customer who has acquired one or more service images from an electronic marketplace, wherein the computer-executable modules comprising instructions are executable instructions are executable by a computing system to:
   obtain a plurality of service images associated with a uniform control object, each service image capable of being executed by virtual computing devices within a hosted computing environment to implement functionalities on behalf of customers of the hosted computing environment,
   obtain a first instruction set associated with a first service image of the plurality of service images, the first instruction set designated by a provider of the first service image to control virtual computing devices executing the first service image on behalf of individual customers of the first service image, wherein the first instruction set, when executed, causes a computing resource within the hosted computing environment to implement an operation by undertaking a first set of actions associated with the first service image, and
   obtain a second instruction set associated with a second service image of the plurality of service images, the second instruction set designated by a provider of the second service image to control virtual computing devices executing the second service image on behalf of individual customers of the second service image, wherein the second instruction set, when executed, causes a computing resource within the hosted computing environment to implement an operation by undertaking a second set of actions associated with the second service image, generate a user interface including the uniform control object for presentation on a computing device associated with a customer, determine a virtual computing device on the hosted computing environment that is executing the first service image on behalf of the customer, wherein the virtual computing device that is executing the first service image on behalf of the customer implements functionality corresponding to the first service image and is distinct from other virtual computing devices implemented on behalf of other customers, and following an interaction between the computing device associated with the customer and the uniform control object of the user interface, request the computing resource within the hosted computing environment to execute the first instruction set to implement the operation with respect to the virtual computing device that is executing the first service image on behalf of the customer.

19. The computer-readable, non-transitory storage medium of claim 18, wherein the operation implemented by the computing resource includes at least one of activating the first service image, deactivating the first service image, modifying a type of computing resource which is hosting the first service image, modifying the computing resource which is hosting the first service image, transmitting a message to the first service image, pausing the first service image, upgrading the first service image, downgrading the first service image, and outputting a status of operations being performed by the first service image.

20. The computer-readable, non-transitory storage medium of claim 18, wherein the computer-executable instructions are further executable by a computing system to:
   obtain a third instruction set associated with a customized control object and further associated with the first service image; and
   following an interaction with the customized control object, execute the third instruction set.

21. The computer-readable, non-transitory storage medium of claim 18, wherein the first instruction set is only associated with the first service image.

* * * * *

UNITED STATES PATENT AND TRADEMARK OFFICE
CERTIFICATE OF CORRECTION

PATENT NO. : 9,530,156 B2
APPLICATION NO. : 13/249054
DATED : December 27, 2016
INVENTOR(S) : Tyra et al.

It is certified that error appears in the above-identified patent and that said Letters Patent is hereby corrected as shown below:

In the Specification

In Column 5 at Line 6, Change "Database1 ." to --Database1.--.

In Column 5 at Lines 9-10, Change "Database1 ," to --Database1,--.

In the Claims

In Column 21 at Lines 33-34, In Claim 18, after "computer-executable" delete "modules comprising instructions are executable".

Signed and Sealed this
Tenth Day of April, 2018

Andrei Iancu
*Director of the United States Patent and Trademark Office*